United States Patent [19]

Reich et al.

[11] 4,217,143

[45] Aug. 12, 1980

[54] PROCESS FOR PLANT SCALE PRODUCTION OF CEMENT WITH MECHANICAL COMPOUNDING

[75] Inventors: Harry Reich, Oakland, Calif.; Joseph J. Coney, 244 Lakeside Dr., Apt. #15, Oakland, Calif. 94612

[73] Assignee: Joseph J. Coney, Oakland, Calif.

[21] Appl. No.: 28,261

[22] Filed: Apr. 9, 1979

[51] Int. Cl.² ............................................... C04B 7/36
[52] U.S. Cl. .................................... 106/100; 106/102; 106/103
[58] Field of Search ........................ 106/100, 102, 103

[56] References Cited

U.S. PATENT DOCUMENTS

| | | | |
|---|---|---|---|
| 3,066,031 | 11/1962 | Schifferle | 106/100 |
| 3,972,724 | 8/1976 | Entzmann | 106/103 |
| 4,065,321 | 12/1977 | Entzmann | 106/103 |

*Primary Examiner*—James Poer
*Attorney, Agent, or Firm*—Bielen and Peterson

[57] ABSTRACT

A process for plant scale production of cement wherein the materials including at least calcium oxide, silicon dioxide and aluminum oxide are subjected to the steps of grinding to approximately a 200 mesh size, drying to less than 5% water by weight of the materials when mixed, blending to a uniform mixture and compounding in a high velocity compounding mill.

12 Claims, 5 Drawing Figures

PROCESS FOR PLANT SCALE PRODUCTION OF CEMENT WITH MECHANICAL COMPOUNDING

BACKGROUND OF THE INVENTION

The process defined herein, for plant scale production of cement with mechanical compounding is related in part to the process described in U.S. Pat. No. 3,066,031, entitled "Cementitious Material and Method of Preparation Thereof," issued Nov. 27, 1962 to Charles J. Schifferle and assigned to Joseph J. Coney. The process described therein was laboratory developed under the initiative and direction of Joseph J. Coney. It has been demonstrated, as described in said patent which is incorporated herein by reference, that a cementitious material can be produced without the expensive kiln operation of clinkering to obtain a high strength cement of the quality of Portland cement. Granular raw materials as specified were mixed, dried if necessary, and were attrition ground to 200 mesh or less. The grinding was continued until samples that are extracted and hydrated indicate, by measurement of the heat of hydration, that the constituent calcium oxide has reacted with the other metallic oxides of the mixture to the degree desired. It was thought that the prolonged attrition grinding caused the formation of the cementitious material.

While the process described in the Schifferle patent was adequate to demonstrate operability of the concept, it was inefficient and inapplicable to a production plant operation by simple scaling. The attrition grinding operation was difficult to regulate from the standpoint of quality control, and the ability to control diminished with scaling increases. Determination of appropriate product quality was primarily by periodic sampling. Furthermore, the energy expended in the prolonged grinding operation was detrimental to the overall cost justification of the process. It was subsequently discovered that it was not attrition grinding as a whole that caused the cementitious composition to form but rather facet or side effect of the grinding process that actually was the cause.

These and other difficulties made application of the laboratory process to a production plan unattractive until the development of the substantial improvements described herein wherein the particular cause of the formation process was defined and specified.

SUMMARY OF THE INVENTION

This invention relates to improvements in the production of a cementitious material by a process that includes a mechanical compounding to induce a chemical or bonding reaction equivalent to the high temperature thermal treatment for inducing the reaction among the component materials. By proper selection of the ingredient materials, their respective proportion, and proper processing, the resultant cementitious material is fully equivalent to Portland cement or any other cement produced by a conventional kiln and clinker method. The present improvements to the process described in the above referenced patent enable the cementitious material to be produced on a production plant scale with continuous control over the quality.

It has been discovered that in the attrition grinding process there occurs as one facet of the grinding process a mechanical compounding by the mutual impact of minute particles of the constituent reactant materials. The compounding process was collateral to the actual grinding or reduction in size of the granular constituents. It was discovered that emphasizing an impacting process as opposed to grinding substantially reduced the time in which the interreaction of the constituent materials occurred. Furthermore, it was discovered that the mutual physical association of minute particles in a blended mixture further reduced the time for the compounding process to occur. Thus, it was far more efficient to grind the constituent materials to a minute particle consistency, in the order of 200 mesh size, prior to blending to achieve a uniform mixture and proximate association of the constituent materials before compounding. Since the process of compounding requires a substantial mechanical energy, all reductions in time for the reaction among the constituent materials to occur result in substantial savings in power costs in physically driving the compounding mill.

Additionally, by separating a grinding step from the compounding process, the reaction time for compounding is far more predictable enabling large quantities of material to be processed in a continuously controlled manner.

Since the compounding process is a kinetic energy process separate and apart from the grinding process, special processing equipment was devised in order to effectively and efficiently mechanically induce the chemical reaction between the base material, calcium oxide, and the other metallic oxides, including silicon dioxides and aluminum oxide, in a continuous manner.

This equipment comprises an elongated drum with feed means to allow the constituent material blend to be fed at one end, and discharge means to allow the compounded cementitious material to be discharged at the opposite end. Concentrically located within the drum is a shaft that is rotatable with respect to the drum. On the shaft are a series of impact vanes that project radially from the axis of the shaft to a radial distance short of the inner wall of the drum. The shaft and impact vanes rotate at sufficient rotational speeds to impart energy to steel shot in the drum. This impact velocity is imparted to steel shot in the blend which alters the composition of the blend. This alteration is generated by the impact forces from the steel shot which are imparted to the material in the blend.

In order to prevent buildup of the blend on the walls of the outer drum, the drum is slowly rotated such that caking is prevented and the blend is thoroughly manipulated by the impact vanes. The clearance between the tip of the vane and the wall of the drum must be such as to not only provide an operating clearance, but sufficient to prevent large stresses that may result from wedging action of the blend material between the end of the vane and the wall of the drum. The clearance must, however, not be so great as to diminish the effectiveness of the vane action on as much of the blend material as possible.

The required equipment and its arrangement for production scale cement plants in utilizing fly ash as the principal constituent component material for blending with quicklime are described in the detailed description of preferred embodiments as exemplars of both a large scale stationary plant and a small scale portable plant, which embody the improved process for production of cementitious material without kiln clinkering of the component materials.

DETAILED DESCRIPTION OF THE PREFERRED EMBODIMENTS

Figure 1:
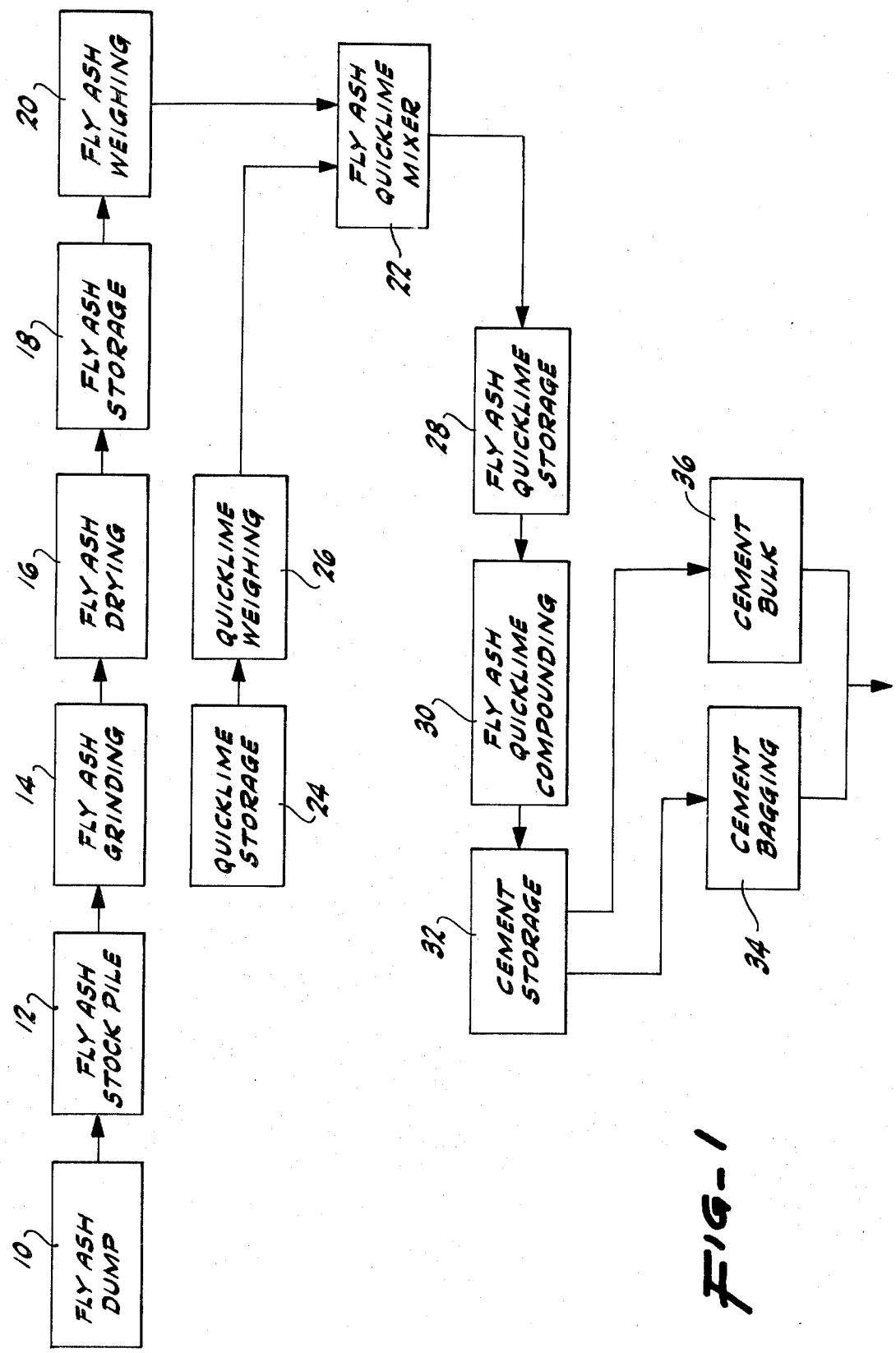
FIG. 1 is a block diagram of the process.

As described in the referenced patent issued to Charles J. Schifferle, the preparation of a cementitious material without clinkering can be accomplished with a variety of starting materials, so long as the three basic components are present in certain broad ranges of proportions.

The composition of the cement may vary widely without loss of strength in the resultant concrete product. In all cases the cement contains calcium oxide and a reactant mixture containing silicon dioxide and aluminum oxide. Fairly strong cements have even been made by this method using calcium oxide and pure aluminum oxide as a reactant. However, best results in terms of increased strength of the ultimate concrete product are obtained when a reactant mixture of silicon dioxide and aluminum oxide is compounded with calcium oxide.

Table I gives ranges of suitable and optimum composition of non-volatile solids in the cement in terms of percentages by weight based on the total weight of CaO, $SiO_2$, $Al_2O_3$ and a carbonate selected from the group consisting of calcium, magnesium carbonate, and mixtures of such carbonates. The range marked "suitable" includes cements that need not produce an extremely strong concrete, whereas the "optimum" range provides a concrete of very high strength. However, it should be understood that the optimum amounts of the various components in the cement vary considerably depending upon the particular materials employed.

TABLE I

|  | Suitable | Optimum |
| --- | --- | --- |
| Calcium oxide | 5–75 | 25–50 |
| Silicon dioxide | 1–94 | 10–30 |
| Aluminum oxide | 1–94 | 5–30 |
| Iron oxide | 0–25 | 0–12 |
| Calcium carbonate and magnesium carbonate, alone or together | 0–50 | 0–10 |

The range of proportions in percent by weight on the ignited basis generally employed for the manufacture of Portland cement is given in Table II. From this it can be seen that Portland cement is limited to a much smaller range of proportions than the cement prepared by the method hereof.

TABLE II

| Calcium oxide | 60–67 |
| --- | --- |
| Silicon | 17–25 |
| Aluminum oxide | 3–8 |
| Iron oxide | 0.5–6 |
| Magnesium oxide | 0.1–5.0 |

Raw materials that contain a large proportion of compounds other than calcium oxide, silicon dioxide, aluminum oxide, iron oxide and calcium carbonate should preferably not be included to any substantial extent in the cementitious mixture before compounding. The non-volatile solids in the mixture should be composed of at least 80 percent of calcium oxide, silcon dioxide, aluminum oxide, iron oxide and a carbonate selected from the group consisting of calcium carbonate, magnesium carbonate and mixtures of such carbonates. For best results, at least 90 percent of this mixture should be composed of such materials. Other non-volatile solids should compose less than 20 percent of the original mixture prior to compounding if they are reactive either during compounding or during formation of the mortar or concrete.

Some raw materials may be mixed alone with calcium oxide to prepare the cement hereof. In order to obtain the optimum proportions of reactants specified in Table I, it is sometimes necessary to mix more than one raw material with calcium oxide. Generally, the raw materials contain more than one reactant metal oxide. For example, a fly ash contains silicon dioxide, aluminum oxide, ferric oxide, calcium oxide and magnesium oxide. All of these components may go into the cement and they are included in the calculation of the total amount of each component present in the mixture. The amount of each raw material required to provide the desired cement composition is readily calculated from an analysis of the raw material, in accordance with proportioning procedure well known in the Portland cement art. Common waste materials may be utilized as base materials in this process, such as ground glass, furnace slag, rice hull ash and fly ash.

Two embodiments of the process are disclosed in the detailed description of the preferred embodiments in order to demonstrate the broad range in size of the production plants possible when using the improved compounding process described. Because of the large size of the kiln necessary in the customary clinkering process for necessary economics of operation, such a range in the size of a cement production plant has not heretofore been possible. Fly ash is selected as an exemplar base material for use in description of the process and is combined with calcium oxide which for simplicity of description is in the form of quicklime. Fly ash is readily available waste material and has the constituent elements of silicon dioxide, aluminum oxide, ferric oxide, calcium oxide, and magnesium oxide which make for a high strength cementitious material. It is to be understood that the component materials present in fly ash may similarly be present in multiple separate sources that can be blended and processed according to the basic process described for the preferred embodiments.

Referring to the block diagram of FIG. 1, fly ash retrieved from a fly ash dump represented in block 10 is either transported to a fly ash stock pile represented by block 12 or in the case of a portable plant, the plant is transported to the fly ash dump, thereby saving transportation costs. From the fly ash stock pile, which should be adequate to provide a continuous supply for the processing plant once the process is commenced, the fly ash is transported by conventional continuous transport means such as a conveyor system to a grinding station represented by block 14 where the fly ash is ground to a 200 mesh or less consistency.

The ground fly ash is transported to a drying kiln represented by block 16 where the raw material is dried to eliminate moisture in excess of approximately 5% moisture by weight. Ideally, the drying step can be eliminated by using dry fly ash obtained directly from the combustion process of a power plant. Conveyance of the finely powdered material may be by transport belt systems or pneumatic air systems transported or conveyed to a storage container represented by block 18 which may simply comprise a hopper for temporary storage of sufficient material to insure continuous processing. From storage, the fly ash is metered, for example, by weighing as represented in block 20 before being conveyed to a mixer represented by block 22. At the mixer, quicklime from a quicklime storage container represented by block 24 having a similar consistency of 200 mesh or less is metered at weighing station represented by block 26 in order that the proper proportion of quicklime can be mixed with the fly ash in the mixer.

The fly ash and quicklime are intimately mixed before being conveyed to a storage container represented by block 28 in order that a continuous supply of blended material can be provided to compounding equipment represented by block 30.

The compounding is done in a continuous process and the product of the compounded mixture is a cementitious material that is conveyed to a cement storage container represented by block 32 before discharge to a bagging equipment represented by block 34 or bulk transport means represented by block 36.

This basic flow diagram is applicable to both of the production plants described in greater detail hereafter.

Figure 2:
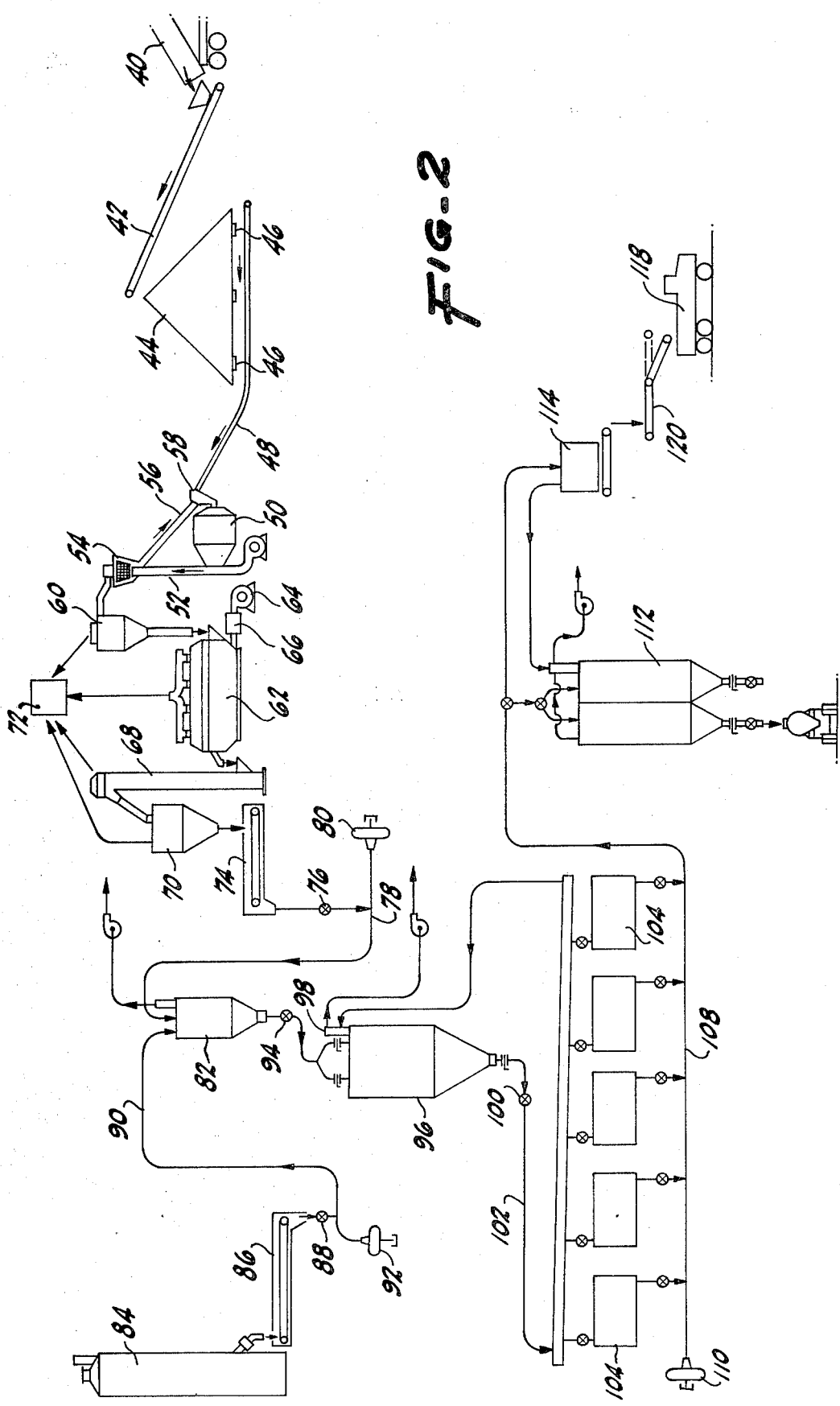
FIG. 2 is a schematic diagram of the process for a large scale fixed plant.

The fixed or stationary production plant shown in the schematic drawing of FIG. 2, is of a manageable size to enable it to be located near a material supply of moderate size. Unlike large kilns, as in prior processes, the plant size can be justified for location near either the source of quicklime or the source of the reactant materials. For other locations the additional transportation costs for the raw materials must naturally be taken into consideration in the overall economic feasibility of the plant. The plant design of FIG. 2 is for a production plant having a capacity of approximately 40 tons per hour.

Referring to FIG. 2, fly ash is transported from a source via a transportation means such as a truck 40 and conveyed by a radial stacker conveyor 42 to a fly ash stock pile 44. The stock pile should naturally be sufficient for the continuous operation of the production plant given the various trends in interruptions in the source of supply of the fly ash. From the stock pile fly ash is conveyed by a system of vibrating feeders 46 for deposit on a conveyor 48 for transport to a ball mill 50 for grinding the fly ash to a powder like consistency of approximately 200 mesh or less. The finely ground powder is pneumatically conveyed by pneumatic conveyor 52 to an air classifier 54 which separates the 200 mesh size material from any coarser material that has passed through the grinding stage. The coarse material is recirculated through the grinding mill 50 via a conduit 56 with a flop gate return 58. A cyclone 60 aids in collecting and regulating the deposit of the fines passed through the air classifier 54 for uniformly feeding a continuous flow of finely ground fly ash to a vibrating dryer 62.

The dryer 62 is a continuous belt type horizontal dryer which dries the material distributed onto the belt carrier by passing hot air supplied by blower 64 and heating coil 66. The finely ground and dried fly ash is discharged from the dryer 62 to a bucket elevator 68 where it is elevated for discharge into a surge hopper 70. The surger hopper 70 allows a quantity of dried and ground fly ash to be stored for continuous supply to the subsequent stages of the process in the event that there is a stoppage or breakdown of any of the equipment related to the grinding and drying processes.

A dust collector 72 operates in conjunction with the equipment in the grinding and drying stages in order to remove any airborne dust generated by the grinding and drying steps in the process. Material collected in the dust collector 72 can be continuously returned to the dryer for entering the material on stream in the production process.

From the storage hopper 70, material is uniformly discharged to a weigh feeder 74 which regulates the flow of material by weight for proper proportioning in a subsequent blending operation.

From the weigh feeder 74 the ground and dried fly ash passes through an air lock 76 to a pneumatic conveyor 78 operated by a blower 80 for input into a blending bin 82. Concurrently, quicklime that has been dried and ground to a consistency of 200 mesh or less is discharged from a storage bin 84 to a weigh feeder 86 for proper proportioning of the quicklime with the fly ash delivered to the blending bin 82. From the weigh feeder 86 the quicklime passes through an air lock 88 and is conveyed by a pneumatic conveyor 90 operated by blower 92 to the blending bin 82. The blending bin 82 is a vertical type blender with a vertical screw conveyor which elevates the material from bottom and allows it to fall down inside the bin. By this continuous circulation a thorough mixing of the fly ash and quicklime is accomplished. It is estimated that in the type of bin selected the material will pass at least ten times through the screw conveyor before it will leave the bin.

The thoroughly mixed material is discharged at the bottom of the bin through discharge gate 94 to a large storage bin 96 which includes a dust collector 98 to prevent dust generated in the operations from being released to the atmosphere. The blended mixture is discharged from the storage bin through a flow control valve 100 and conveyed by an air activated gravity conveyor 102 for metered discharge into one of the parallel oriented compounders 104.

The finely ground, dried and blended mixture of fly ash and quicklime is mechanically manipulated in the compounders 104 by impact vanes and shot causing a reaction among the constituent materials of the blended mixture. The reacted mixture is discharged from the compounders as a cementitious material equivalent to conventional cementitious materials processed by a kiln and ground clinker process. The cementitious material discharged from the compounders is conveyed by a pneumatic conveyor 108 operated by a blower 110 to either a bulk cement storage bin 112 or a bagging station 114. The cementitious material is removed from the processing plant by a bulk conveyance truck 116 or in a bag form by a truck 118 loaded by a conveyor system 120.

The schematic illustration of the processing plant of FIG. 2 is designed to handle an output of 40 tons per hour. Naturally, by appropriate selection of the equipment utilized, this rate of production can be increased or decreased accordingly.

Figure 3:
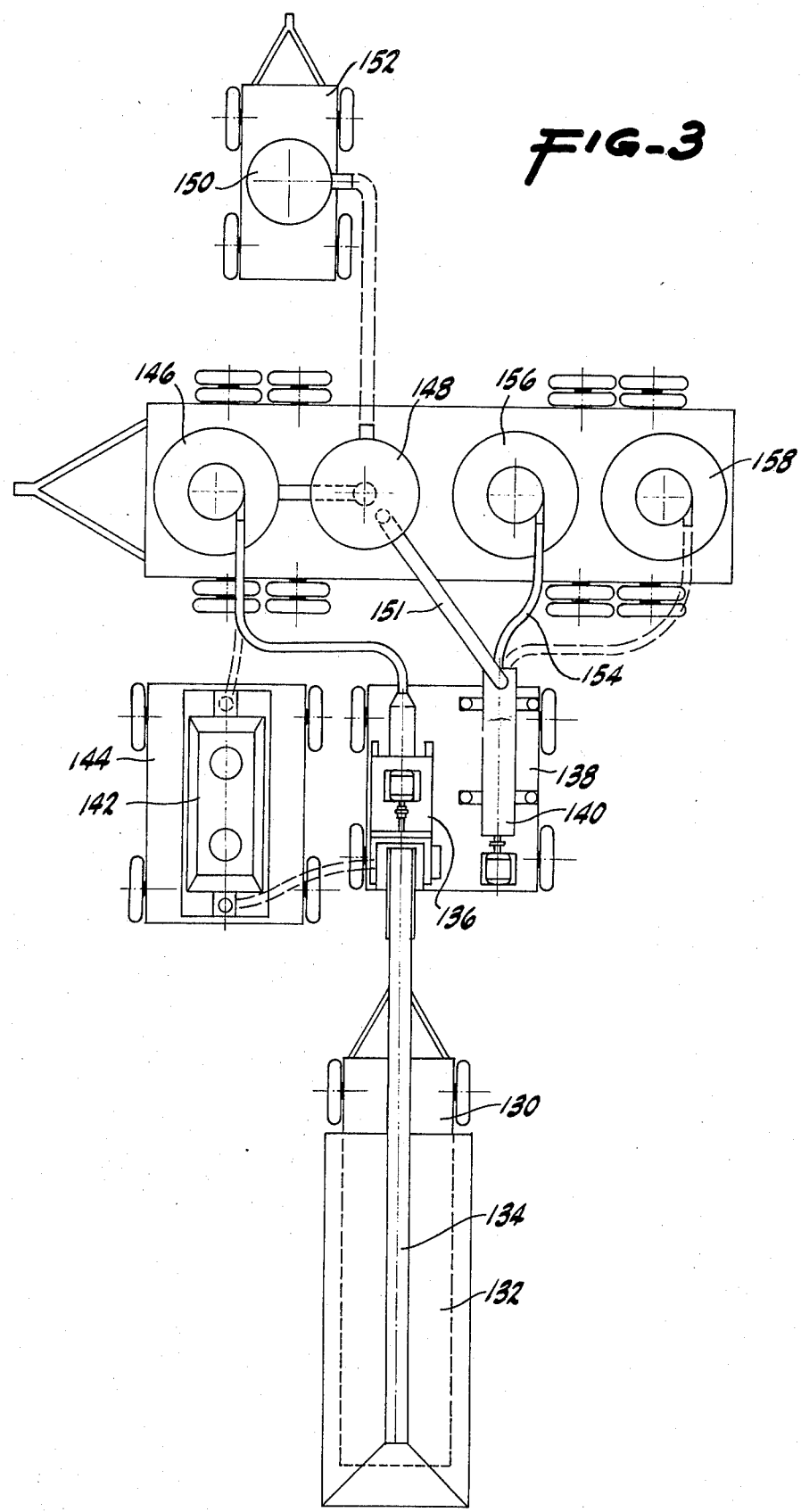
FIG. 3 is a schematic diagram of the process for a small scale portable plant.

In order to demonstrate the broad range of size available for a production plant utilizing the techniques disclosed herein, an exemplar portable processing plant is shown in FIG. 3 and described herein.

Referring to FIG. 3, a schematic plan view of a portable processing plant is illustrated. The portable plant is particularly suited for temporary location at raw material sources of a limited supply. For example in lesser developed areas it is more economical for power plants to be decentralized and located adjacent urban areas. Because of the relative small size of such power plants the ash waste generated must be accumulated over a period of time to be of sufficient quantity to justify the capital expense of a processing plant. A portable plant that is moved from location to location is ideally suited for periodically utilizing the accumulated fly ash waste and converting this waste to a useable cementitious material. Resultant costs in transporting this cementitious material are also conserved since the urban requirements for cement often parallel their requirement for power.

In FIG. 3, a portable hopper rig 130 is shown with a hopper bin 132 and belt conveyor 134 for conveying fly ash that is stored in the hopper bin up an incline to a hammer mill 136 mounted on a portable bed 138 along with a compounder 140. The fly ash is conveyed on the belt conveyor 134 and deposited in the hammer mill 136 and ground to a fine particulate composition of 200 mesh or less. From the hammer mill the ground fly ash material is either transported by a pneumatic line to a vibrating dryer 142 mounted on a portable bed 144 or to a storage bin 146 depending on whether the moisture content exceeds approximately 5% of the weight of the material. The dry finely ground fly ash in storage bin 146 is conveyed to a vertical mixer 148 where it is mixed with quicklime from a quicklime storage bin 150 mounted on a portable bed 152. The blended material of fly ash and quicklime discharge from the vertical mixer 148 is conveyed by a pneumatic line 150 to the compounder 140 on the portable bed 138. In the compounder the mixture is compounded by an impact velocity vane device such that the components of the mixture react and form a cementitious material as previously described. The cementitious material formed in the compounder 140 is discharged through a pneumatic line 154 to one of two storage bins 156 and 158. The various pneumatic lines connecting the various stages of the process are flexible and easily disconnected such that each of the portable beds are separately movable by towing.

The portable system shown in FIG. 3 is capable of handling somewhat greater than one ton per hour of product material. Power for the equipment can be supplied by a conventional power source or generated on site by power generators.

The majority of the equipment utilized in both the stationary processing plant and the portable plant are conventional. The compounder, however, is specially designed to perform the step of inducing a reaction among the constituent materials by a high speed mechanical impact method rather than the conventional high temperature kiln method. The compounder is designed to cause the mutual impact of minute particles of constituent components of the blended mixture under localized conditions of relatively high temperature and high pressure. During the normal operation of the compounder temperatures within the compounder rise to approximately 300° F. without external application of any thermal energy. Thermal energy is generated within the compounder the dissipation of kinetic energy imparted by the high speed rotating vanes to the steel shot and particle blend.

Figure 4:
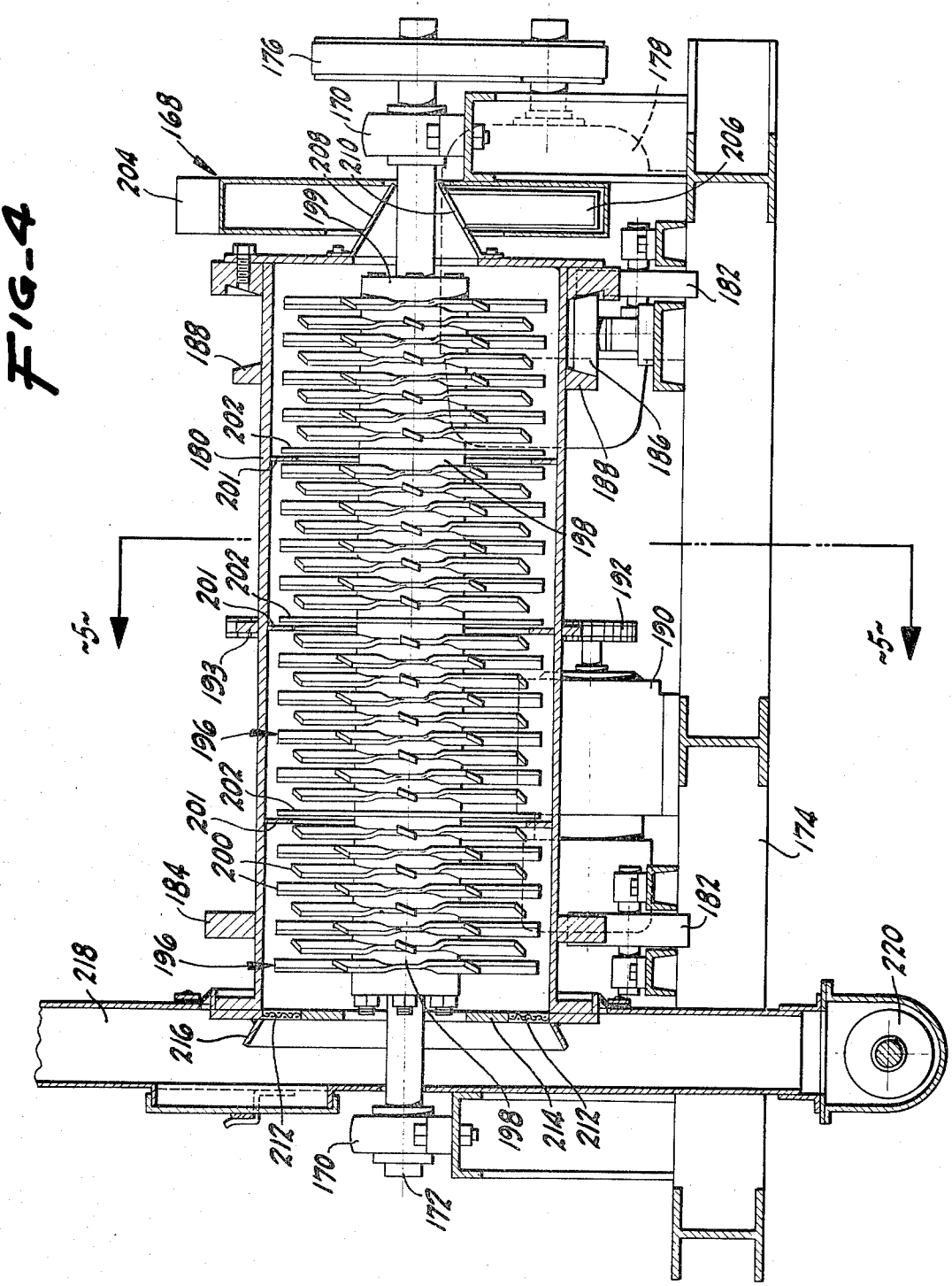
FIG. 4 is a elevational sectional view of a compounder device used in the process.

The cross sectional view of the exemplar compounder 168 shown in FIG. 4 for a small operation details the internal mechanism that produces the impacting process for mechanically inducing the reaction among the constituent materials of the blend.

Mounted in large journal bearings 170 is an elongated central shaft 172. The journal bearings supporting the shaft 172 are mounted on a frame structure 174 which provides overall support for the components of the compounder. The shaft 172 is driven by a belt drive system 176 connected to a high speed electric motor 178. Concentrically arranged around the shaft 172 is an outer cylindrical drum 180 which is independently supported on two spaced pairs of bearing rollers 182 (one shown at each end of the drum) which is mounted on the frame 174 and engage spaced bearing rings 184 circumferentially arranged around the periphery of the drum 180. The bearing rollers 182 support the drum by contacting each bearing ring at two points thereby preventing any lateral movement. Longitudinal movement is inhibited by a flange bearing 186 which is located on the frame 174 below the drum and between a bracketing guide-trace ring 188 circumferentially mounted around the periphery of the drum. The drum 180 is independently driven by an electric drive motor 190 with a chain 192 that engages a sprocket 193 around the outer periphery of the drum. The drive motor is a relatively slow speed motor to rotate the drum slowly about the central shaft in the fashion of a conventional mixer to prevent caking and to allow the blended materials to be thoroughly processed. The drum preferably rotates in an opposite direction than the shaft.

Figure 5:
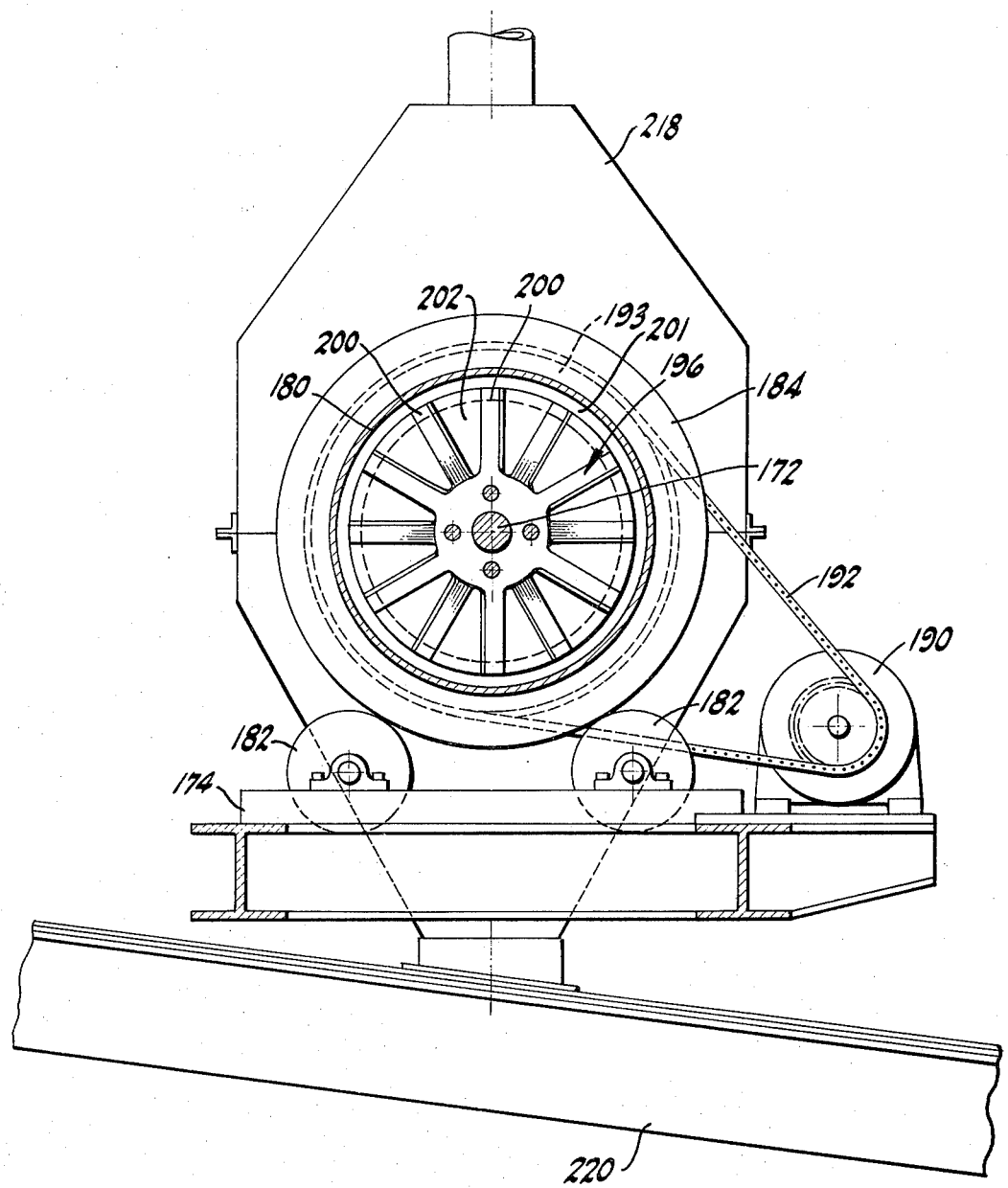
FIG. 5 is a cross-sectional view of the compounder device of FIG. 4.

Located within the drum 180 and fixed to the central shaft 172 is a bolted unit 194 comprised of a plurality of alternating vane spiders 196 and spacers 198. The vane spiders, the configuration of which are shown in FIG. 5, each have six projecting impact vanes 200 which rotate at high velocities to impact steel shot in the blended mixture and induce the cement producing reaction. A limited number of periodic spacers 201 and 202 inhibit flow of material through the compounder 168 to allow for partial segmentation of the compounding process such that the incoming blended mixture of material does not become mixed with the compounded material about to be discharged.

The blended mixture of constituent materials enters conduit 204 and is metered into the compounder by a rotating scoop 206 mounted to a conical end face 208 on the slowly rotating drum 180. The conical end face 208 has an opening 210 through which the scooped material falls when the scoop is positioned at the top of its rotational cycle. The material enters the main body of the drum 180 and is impacted or compounded by action of the vanes which rotate at speeds up to 1000 r.p.m. Each vane has a slight twist or skew of fifteen degrees which provides a directional movement to the material being compounded from the intake to the discharge.

The steel shot used in the compounder, preferably has a diameter of approximately 1/16 inch and not only aids in obtaining a thorough mixing within the drum, eliminating caking, but causes high localized impact pressures. The amount of shot should occupy approximately ⅛-¼ of the drum space in the compounder.

The blended material entering the compounder is processed for approximately 7 minutes in the compounder. The size of the compounder can vary according to the plant design and can reach a diameter size of 10 feet. Vane tip velocity of 65 ft/sec has been found to provide good results. The compounded, now cementitious material, that has passed the length of the drum is discharged through openings 212 in the end plate 214 and off the flaring 216 at the end of the drum 180. The shot is prevented from being discharged from the compounder by screening 217. The cementitious material is accumulated in a collector hood 218 and on settling is transported by a conveyor 220 to the packing or bulk storage of operation.

While in the foregoing specification embodiments of the present invention have been set forth in considerable detail for the purpose of making a complete disclosure of the invention, it will be apparent to those of ordinary skill in the art that numerous changes may be made in such details without departing from the spirit and principles of the invention.

What is claimed is:

1. An improved method of producing on a production plant scale a cementitious material by mechanical compounding of constituent material of at least calcium oxide, silicon dioxide and aluminum oxide comprising the steps of:
    grinding said constituent materials to approximately a 200 mesh size;
    mixing said ground constituent materials to a uniformly blended material; and subsequently in a separate step,
    impact compounding said ground and blended constituent material by mechanical impacting of said uniformly blended material until said constituent materials have reacted to form a cementitious material.

2. The method of claim 1 wherein the grinding of said calcium oxide is accomplished separately from the remaining constituent materials.

3. The method of claim 1 wherein said step of compounding is accomplished by a rotating, impacting device having a plurality of vanes mounted on a shaft, said shaft being rotated in the presence of an impacting material.

4. The method of claim 3 wherein said vanes have a vane tip and said shaft is rotated to impart a velocity of approximately 65 ft/sec at said vane tip.

5. The method of claim 3 wherein said shaft has an axis of rotation and said vanes are skewed to said axis of rotation to impart a gradual directional movement to the constituent material being compounded.

6. The method of claim 5 wherein said shaft and vanes are rotationally mounted within a concentrically arranged drum, wherein said drum has an inside wall and said projecting vane portion of said spiders have a distal end spaced from, and with a locus of rotation proximate to, said inside wall of said drum.

7. The method of claim 6 wherein said shaft and vanes are mounted within said concentrically arranged drum rotated at a rotational velocity substantially less than the rotational velocity of said rotating shaft and vanes.

8. The method of claim 7 wherein said impacting material is retained in said drum in said compounding step with said constituent materials and comprises steel shot.

9. The method of claim 1 including the step of drying said constituent materials prior to said mixing step.

10. An improved method of producing on a production plant scale a cementitious material by mechanical compounding of constituent material of at least calcium oxide, silicon dioxide and aluminum oxide comprising the steps of:
    grinding said constituent materials to a minute particle consistency; and subsequently in a separate step,
    impact compounding said constituent materials by mechanical impacting of said ground materials until said constituent materials have reacted to form a cementitious material.

11. The method of claim 10 wherein said mechanical impacting is accomplished by apparatus having impact means operated at a substantial velocity for imparting kenetic energy to said constituent materials.

12. The method of claim 10 wherein said constituent materials are mixed to a uniform blend concurrent to said grinding step.

* * * * *